United States Patent Office 3,210,057
Patented Oct. 5, 1965

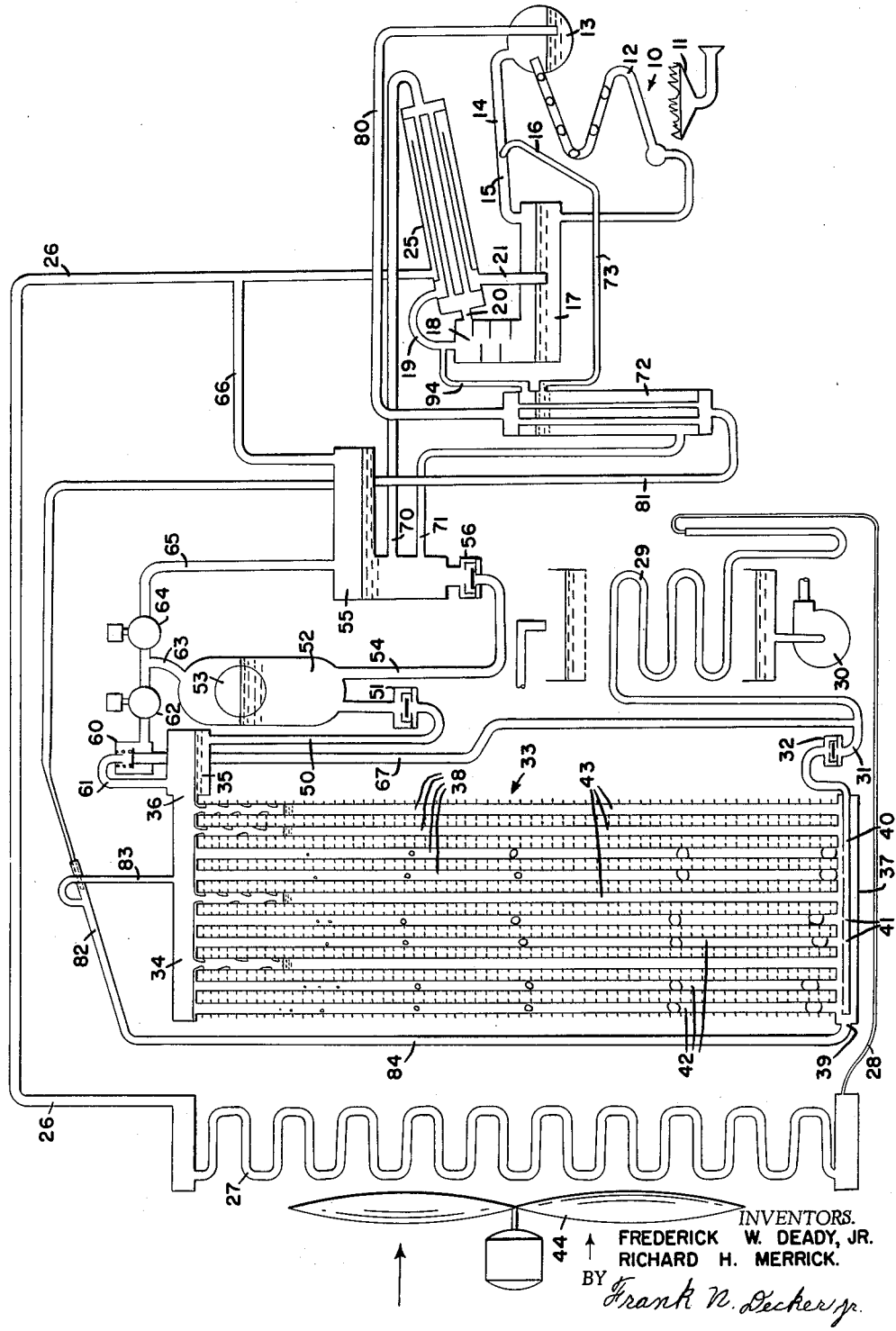

3,210,057
ABSORPTION REFRIGERATION SYSTEMS
Frederick W. Deady, Jr. and Richard H. Merrick, Indianapolis, Ind., assignors to Carrier Corporation, Syracuse, N.Y., a corporation of Delaware
Filed Feb. 11, 1963, Ser. No. 257,576
6 Claims. (Cl. 261—128)

This invention relates to absorption refrigeration systems and, more particularly to method and apparatus for providing improved absorber performance in an absorption refrigeration machine.

This invention is particularly useful in absorption refrigeration systems of the type which employ ammonia as a refrigerant and water as an absorbent, such as described in Patent No. 3,038,320, granted June 12, 1962, to which reference is made for a description of a similar type of absorption refrigeration system.

Absorption refrigeration systems of this type may employ an absorber section having an upper header and a lower header and having a plurality of absorber passages interconnecting the upper and lower headers for the passage of an absorbent solution and for the absorption of refrigerant vapor therein. An absorber section of this type is described in Patent No. 3,037,361, granted June 5, 1962.

Investigation into the performance of absorbers of the type referred to has disclosed that some of the vertical absorber tubes actually absorb very little refrigerant vapor in comparison with other absorber tubes of the same absorber section, thereby rendering the overall absorber performance less efficient than the theoretically obtainable efficiency. This effect tends not only to render the affected tubes ineffective for the absorption of refrigerant vapor, but also occurs in a haphazard pattern and tends to disrupt the orderly passage of refrigerant vapor from the refrigerant vapor distributor into the absorber tubes further adversely affecting overall absorber performance.

In accordance with this invention, there is provided a refrigerant vapor distributor header which effectively establishes a controlled recirculation of absorbent solution throughout the absorber section of an absorption refrigeration system so as to optimize the pattern of recirculation and absorption in the absorber to provide an increase in efficiency.

It is a principal object of this invention to provide an absorber section of an absorption refrigeration system and an improved method of operating an absorption refrigeration system which result in improved absorption of refrigerant vapor and improved overall performance of the absorber section.

It is a further object of this invention to provide a controlled recirculation pattern of absorbent solution in the absorber section of an absorption refrigeration machine.

In accordance with a preferred embodiment of this invention there is provided an absorption refrigeration system having an absorber section with an upper and a lower header interconnected by a plurality of generally vertical absorber tubes. Refrigerant vapor is injected into only some of the absorber tubes so that other absorber tubes serve to recirculate absorbent solution downwardly from the upper header to the lower header in an efficient recirculation pattern.

It will be appreciated that where the inlet of strong absorbent solution into the absorber section is spaced from the outlet of relatively weaker absorbent solution by a number of absorber tubes, a concentration gradient of absorbent solution may exist between the various absorber tubes. It is therefore preferred to recirculate more of the relatively weaker absorbent solution by providing more recirculating solution passage adjacent the weak solution outlet than are provided adjacent the strong solution inlet to the absorber section. This results in increased flow of the relatively weak absorbent solution thereby increasing heat transfer from the weaker solution to the ambient air and lengthening of the period of contact between the weaker absorbent solution and the refrigerant vapor, which results in better absorption of refrigerant vapor by the weak solution and unexpectedly improved overall absorber performance.

These and other objects of this invention will become more apparent by a consideration of the following detailed description and the attached drawing which schematically represents a cross-section through an improved absorption refrigeration system in accordance with this invention.

Referring particularly to the drawing, there is provided a generator section 10 having a heat source 11, such as a gas fired burner. Absorbent solution having refrigerant absorbed or dissolved therein is supplied to the generator section and flows through generator tubes 12, which are heated by burner 11. Heating of the solution causes the refrigerant to be vaporized or boiled out of the absorbent solution. The resulting mixture of vaporized refrigerant and hot absorbent solution is passed into separation chamber 13.

A suitable absorbent for a refrigeration system of the type herein described is water, and a suitable refrigerant is ammonia. As used in this description, the absorbent solution which is collected in separation chamber 13 may be thought of as being a relatively strong solution because the solution is strong is absorbing power. Conversely, the absorbent solution passed to the generator may be thought of as being a relatively weak solution because it has a substantial quantity of refrigerant absorbed therein and the solution is therefore weak in absorbing power.

Since the absorbent, which may be water, and the refrigerant, which may be ammonia, are both volatile, some absorbent vapor is carried into vapor passage 14 along with the refrigerant vapor which has been distilled from the weak absorbent solution passed into the generator section. This mixture of absorbent and refrigerant vapor passes through a preanalyzer section or passage 15 wherein it flows concurrently with weak solution passed into the preanalyzer section from a weak solution line 16. The resulting gas and liquid contact in the preanalyzer section gives rise to a mass and heat transfer effect by which some of the absorbent vapor, which is relatively less volatile than the refrigerant vapor and therefore is more easily condensed, is condensed, thereby purifying the refrigerant vapor.

The refrigerant vapor is then passed along with the condensed absorbent solution into generator reservoir 17. which contains a quantity of absorbent solution in the bottom thereof. The refrigerant vapor passes over the top of the absorbent solution in generator reservoir 17 and up through analyzer section 18. Weak solution passes from a weak solution passage 20 over a series of plates or other suitable analyzer packing material in contact with the refrigerant vapor. A mass and heat transfer again takes place in analyzer section 18 to further purify the refrigerant vapor by condensing the relatively less volatile absorbent vapor.

The purified refrigerant vapor is then passed from the analyzer section through vapor passage 19 into rectifier section 25. Rectifier section 25 comprises a heat exchanger wherein relative cool weak solution is passed through the heat exchanger and out weak solution passage 20 in heat exchange relation with the refrigerant vapor. The cool weak solution therefore condenses further absorbent vapor from the refrigerant vapor and the condensed absorbent solution is passed through a drain passage 21 in the heat exchanger to generator reservoir 17.

The thus highly purified refrigerant vapor is then passed through vapor passage 26 into condenser section 27 of the absorption refrigeration system. Air or other suitable ambient cooling fluid is passed over the exterior of the heat exchange tubes which form condenser section 27 to cool and condense the refrigerant vapor passed thereto.

The condensed refrigerant liquid passes through a restriction device 28, such as a capillary tube, and into the coil of a chiller section 29. Water or other heat exchange fluid to be cooled is passed over the exterior of the coil in chiller section 29 and heat is extracted from the heat exchange fluid which is then passed by pump 30 to a suitable location to provide the desired refrigeration effect in the region to be refrigerated or air conditioned. The heat extracted from the heat exchange fluid is absorbed by the refrigerant liquid causing the refrigerant to again vaporize in the coil of chiller section 29.

The vaporized refrigerant is then passed through passage 31 having a check valve 32 therein to absorber section 33. Absorber section 33 comprises an upper header 34 having an outlet passage 36 for discharging weak absorbent solution into inlet tank 35. Absorber section 33 is also provided with a lower header 37 and a plurality of absorber tubes or passages, generally designated 38, having open ends communicating with the upper and lower headers. Absorber tubes 38 permit the flow of absorbent solution between upper and lower headers 34 and 37, as will be subsequently described.

Preferably, absorber tubes 38 are spaced from one another and provided with suitable fins so that air or other ambient cooling fluid may be passed over the absorber tubes to cool the absorbent solution therein. It will be appreciated that a single fan 44 may be used to pass air over absorber tubes 38 and the heat exchange coil or tubes in condenser section 27, if desired.

A refrigerant vapor inlet distributor 40 is provided in lower header 37 and is connected to refrigerant vapor line 31, as shown in the drawing, to admit refrigerant vapor into the open ends of certain predetermined absorber tubes 38 through orifices 41 in the distributor 40. Orifices 41 are provided in distributor 40 to inject or directly pass refrigerant vapor into the open ends of some of the absorber tubes, designated 42, and no orifices are provided to directly distribute refrigerant vapor into the open ends of other absorber tubes, designated 43.

It will be noted that a strong solution inlet 39 is provided in lower header 37, which is spaced from weak solution outlet 36 of upper header 34 by absorber tubes 38. It will also be observed that more orifices 41 are located for distribution of refrigerant vapor into the absorber tubes which are closely adjacent strong solution inlet 39 of lower header 37 than are located for distribution of refrigerant vapor into the ends of absorber tubes which are closely adjacent the weak solution outlet 36 of upper header 34.

In operation, the absorber tubes 42 having associated adjacent inlet orifices have a mixture of refrigerant vapor and absorbent solution flowing through them from lower header 37 toward upper header 34. As the mixture of vapor and solution rises upwardly in absorber tubes 42, the refrigerant vapor is absorbed into the absorbent solution so that very little, if any, refrigerant vapor reaches upper header 34. At the same time, the absorber tubes 43 which do not have adjacent refrigerant vapor orifices are permitted to carry absorbent solution downwardly from upper header 34 to lower header 37 in a controlled recirculation pattern throughout the absorber.

By controlling and optimizing the pattern of recirculation to provide the desired pattern within the absorber, it is assured that all of the absorber tubes into which vapor is injected function to efficiently absorb vapor.

Also, the height of the column of the solution in recirculating tubes 43 balances off the weight of solution in tubes 42. Since tubes 42 are partially filled with vapor bubbles, it may occur that tubes 43 run only partly full of solution, as shown in the drawing. This may actually result in some improved absorber efficiency by reason of permitting some absorption to take place along the surface of absorbent solution spilling from header 34 downwardly into the top of recirculating tubes 43.

Consequently, all recirculation of absorbent solution from upper header 34 to lower header 37 takes place in the tubes 43 into which no refrigerant vapor is directly injected so that there is no tendency to oppose the orderly and efficient upward movement of refrigerant vapor and absorbent solution in the remaining absorber tubes 42.

Furthermore, the effectiveness of the absorber varies inversely as a function of the temperature of the absorbent solution therein. As will be seen, the absorbent solution which is passed downwardly through recirculating tubes 43 is cooled as it is being recirculated downwardly so that its capacity for absorbing refrigerant vapor when it is subsequently returned upwardly through tubes 42 is improved. The velocity of absorbent solution in all the tubes 38 is greater than in absorbers without controlled recirculation, thereby increasing the heat transfer coefficient. As a result, it has been found that even though the recirculated solution is somewhat weaker than the strong solution injected initially into absorber section 33, the additional cooling of this solution and the optimizing of the recirculation patterns within the absorber section, unexpectedly results in a markedly more efficient absorber than an absorber of the same physical arrangement, but which has vapor injected into each of the absorber tubes.

For a particular absorber section, the best pattern for recirculation may be ascertained by experiment, but it has been found that a highly satisfactory and preferred recirculation pattern in a twenty-five tube absorber results when about sisxteen tubes have absorbent solution injected directly into them and about nine of the absorber tubes have no solution directly injected into them and are used instead for recirculation. It has also been found that a desirable distribution pattern and high absorber efficiency is achieved by providing a pair of absorber tubes into which solution is injected flanked by a single absorber tube into which absorbent solution is not directly injected in the region of the absorber section adjacent the strong solution inlet, but to provide one or more extra recirculating tubes adjacent the weak solution outlet, such as shown in the drawing. This provides some additional cooling of the relatively weaker solution in the absorber section to compensate for its decreased absorption capability.

The weak absorbent solution having dissolved therein considerable refrigerant vapor is passed through outlet 36 into inlet tank 35, as previously explained. From inlet tank 35, the weak solution flows through passage 50, solution check valve 51 into solution trap 52. Solution trap 52 may have a float 53 therein for actuating associated valves. Weak solution flows from solution trap 52 through outlet passage 54 and check valve 56 into outlet tank 55.

From outlet tank 55, the weak solution is divided into two portions. The first portion of the weak solution flows through passage 70 through the interior of rectifier 25, passage 20 and analyzer 18 into generator reservoir 17, thereby condensing absorbent vapor in the rectifier and analyzer, as previously described.

The other portion of the weak solution is passed from outlet tank 55 through passage 71 into heat exchanger 72 where it is warmed. After passing through the heat exchanger, the warmed weak solution passes through passage 73 into preanalyzer section 15, where it initially condenses some absosrbent vapor passing through the preanalyzer section from generator section 10 to generator reservoir 17, as previously described.

The operation of solution trap 52 is more completely described in Patent No. 3,038,320, granted June 12, 1962. Briefly, a low pressure valve 62 serves to vent trap 52 through passage 63, blow-down valve 60, and pressure equalizer line 61 to the inlet tank when valve 62 is open. Under these circumstances, high pressure valve 64 in pressure equalizer line 65 leading from outlet tank 55 is closed. When weak solution has drained into trap 52 from tank 35 so that float valve 53 reaches the upper portion of the trap, low pressure valve 62 is closed and high pressure valve 64 is opened by float 53, thereby pressurizing the trap chamber with high side refrigerant vapor from outlet tank 55 which is pressurized through refrigerant vapor line 66. This causes trap 52 to drain weak solution through line 54 into outlet tank 55.

After 52 has drained, suitable control mechanism automatically opens low pressure valve 62 and closes high pressure valve 64 to repeat the solution transfer cycle. Initially upon opening of low pressure valve 62 residual pressure acting on the underside of the diaphragm of blow-down valve 60 opens the blow-down valve so as to vent the pressure in the trap through line 67 to vapor distributor 40 in the bottom of absorber section 33.

The passage of the refrigerant vapor formed in generator section 10 has been now described. The strong solution which also results from the distillation of refrigerant vapor from the weak solution in the generator is collected in separator 13 and passes through passage 80 through the interior of heat exchanger 32, where the hot strong solution is cooled by heat exchange with the relatively cool weak solution passing through line 71, as previously explained. From heat exchanger 72, the strong solution passes through line 81 into the sub-cooled absorber section 82 and passage 84 to inlet 39 in lower header 37 of absorber section 33. A vent line 83 is provided between vapor space at the top of inlet tank 35 and sub-cooled absorber section 82 to induce unabsorbed refrigerant vapor in the top of the inlet tank into the cooled strong solution for better cycle efficiency, as more completely described in Patent No. 3,038,316, granted June 12, 1962.

It will be appreciated that by the practice of this invention there is provided a method of operating an absorption refrigeration system and an absorber construction which results in improved efficiency over prior art practices by providing controlled recirculation of absorbent solution in the absorber section. In addition, an absorber having a controlled and predetermined recirculation pattern as taught by this invention is capable of providing more reliable and more predictable performance as well as unexpectedly improving its overall efficiency.

It will be appreciated that the foregoing description is illustrative of a preferred embodiment of this invention, and that the invention may be otherwise embodied within the scope of the following claims.

We claim:

1. In an absorption refrigeration system, an absorber section comprising an upper header, a lower header, a plurality of vertical absorber tubes having open ends connecting said upper and lower headers, inlet means to admit strong absorbent solution into said absorber section, outlet means to permit weak absorbent solution to leave said absorber section, and a refrigerant vapor distributor header disposed within said lower header, said refrigerant distributor header having a plurality of orifices arranged below the open ends of said absorber tubes for distributing refrigerant vapor upwardly into the open lower ends of only some of said absorber tubes, so that other absorber tubes serves to recirculate absorbent solution downwardly from said upper header to said lower header.

2. An absorption refrigeration system as defined in claim 1 wherein said orifices are arranged beneath a plurality of pairs of adjacent absorber tubes spaced by an absorber tube having no orifice beneath it.

3. An absorption refrigeration system as defined in claim 1 having a greater number of absorber tubes having orifices disposed below them adjacent the strong absorption solution inlet means of the absorber section than there are absorber tubes having orifices disposed below them adjacent the weak absorbent solution outlet means of said absorber section so as to provide greater recirculation of relatively weak absorbent solution than of relatively strong absorbent solution in said absorber section.

4. In an absorption refrigeration system, an absorber section comprising a first header, a second header, said first and second headers being adapted to contain absorbent solution, an inlet for admitting relatively strong absorbent solution into said absorber, an outlet for withdrawing relatively weak absorbent solution from said absorber, said absorber section including means defining a plurality of absorber passages interconnecting said headers for the passage of absorbent solution therebetween, and refrigerant vapor inlet distributor means for admitting refrigerant vapor directly into only some of said absorber passages so that absorbent solution and refrigerant vapor being absorbed thereby flow in contact with each other through said some passages in a direction from one of said headers toward the other of said headers and absorbent solution is recirculated back to said one header through at least another of said passages.

5. An absorption referigeration machine as defined in claim 4 wherein the strong absorbent solution inlet is spaced from the weak solution outlet by means defining a plurality of said absorber passages and said refrigerant vapor distributor means is arranged to directly admit refrigerant vapor into a greater number of said passages adjacent said strong absorbent solution inlet than is admitted to said passages adjacent said weak absorbent solution outlet so as to recirculate more weak absorbent solution than strong absorbent solution in said absorber.

6. An improved method of providing refrigerant absorption in an absorption refrigeration system which comprises the steps of passing refrigerant vapor to be absorbed and absorbent solution in contact with each other through a predetermined set of absorber passages from a first header to a second header, passing absorbent solution from said second header back to said first header through at least another predetermined passage in a controlled pattern for recirculation through said first set of absorber passages, and recirculating more relatively weak absorbent solution than relatively stronger absorbent solution from said second header to said first header.

References Cited by the Examiner

UNITED STATES PATENTS 2,669,440  2/54  Lindenbergh _____ 261—124
3,037,361  6/62  Merrick _____ 62—494 X HARRY B. THORNTON, *Primary Examiner.*

RICHARD A. O'LEARY, *Examiner.*